United States Patent [19]

Lui

[11] Patent Number: 4,818,473
[45] Date of Patent: Apr. 4, 1989

[54] FUEL BUNDLE
[75] Inventor: Chun K. Lui, Monroeville, Pa.
[73] Assignee: Westinghouse Electric Corp., Pittsburgh, Pa.
[21] Appl. No.: 20,190
[22] Filed: Feb. 26, 1987

Related U.S. Application Data

[63] Continuation of Ser. No. 732,032, May 8, 1985, abandoned.

[51] Int. Cl.$^4$ .................................................. G21C 3/32
[52] U.S. Cl. ..................................... 376/261; 376/446
[58] Field of Search ................ 376/446, 440, 449, 353, 376/438, 437, 434, 441, 261; 411/281–284

[56] References Cited

U.S. PATENT DOCUMENTS

| | | | |
|---|---|---|---|
| 3,382,153 | 5/1968 | Bigge et al. | 376/446 |
| 3,431,170 | 3/1969 | Lass et al. | 376/446 |
| 3,443,616 | 5/1969 | Dey | 411/282 |
| 3,635,793 | 1/1972 | Kolb et al. | 376/446 |
| 3,697,375 | 10/1972 | Suvanto et al. | 376/440 |
| 3,736,227 | 5/1973 | Nakazato | 376/446 |
| 3,802,995 | 4/1974 | Fritz et al. | 376/446 |
| 3,920,516 | 11/1975 | Kmonk et al. | 376/441 |
| 3,953,287 | 4/1976 | Long et al. | 376/440 |
| 3,984,284 | 10/1976 | Long et al. | 376/441 |
| 4,036,692 | 7/1977 | Walton | 376/440 |
| 4,038,137 | 7/1977 | Pugh | 376/446 |
| 4,045,287 | 8/1977 | van Santen | 376/440 |
| 4,064,004 | 12/1977 | Long et al. | 376/440 |
| 4,152,206 | 5/1979 | Jabsen | 376/446 |
| 4,175,004 | 11/1979 | Jabsen | 376/441 |
| 4,219,386 | 8/1980 | Osborne et al. | 376/446 |
| 4,221,636 | 9/1980 | Feutrel | 376/441 |
| 4,302,294 | 11/1981 | Leclercq | 376/446 |
| 4,348,353 | 9/1982 | Christiansen et al. | 376/364 |
| 4,391,771 | 7/1983 | Anthony | 376/440 |
| 4,416,848 | 11/1983 | Feutrel | 376/446 |
| 4,427,755 | 6/1984 | Marlatt et al. | 376/440 |
| 4,452,755 | 6/1984 | Hylton | 376/446 |
| 4,492,668 | 1/1985 | Pilgrim, Jr. et al. | 376/440 |
| 4,508,679 | 4/1985 | Matzner et al. | 376/438 |
| 4,563,328 | 1/1986 | Steinke | 376/446 |
| 4,687,631 | 8/1987 | Wilson et al. | 376/446 |

FOREIGN PATENT DOCUMENTS

| | | | |
|---|---|---|---|
| 0656403 | 1/1963 | Canada | 376/ |
| 0073728 | 3/1983 | European Pat. Off. | |
| 3322065 | 1/1984 | Fed. Rep. of Germany . | |
| 3228380 | 2/1984 | Fed. Rep. of Germany | 376/446 |
| 2058306 | 5/1971 | France . | |
| 2154753 | 5/1973 | France . | |
| 2420826 | 11/1979 | France | 376/446 |
| 2533350 | 3/1984 | France | 376/446 |
| 2539548 | 7/1984 | France | 376/446 |
| 0130789 | 10/1979 | Japan | 376/440 |
| 0170791 | 9/1984 | Japan | 376/440 |
| 7405623 | 10/1975 | Netherlands | 376/446 |
| 1418495 | 12/1975 | United Kingdom | 376/ |
| 1501870 | 2/1978 | United Kingdom . | |
| 1596787 | 8/1981 | United Kingdom | 376/446 |

Primary Examiner—Deborah L. Kyle
Assistant Examiner—Daniel Wasil

[57] ABSTRACT

A fuel bundle in which the fuel rods are supported by top and bottom plates and held together by axially spaced straps. Several of the fuel rods are formed as tie rods. Each tie rod has a flat key at the bottom which is passed through a slot in the bottom plate. By turning the tie rod, the key is rotated to a locking position in which its axial movement is prevented. At the top, each tie rod has a flattened plug which is threaded on its rounded sides to receive a nut that has a crimping lip. The plug extends through a slot in the top plate and is threaded to the nut and the crimping lip is crimped to the plug. The tip of the plug is flat. During reconstitution of the fuel bundle, the crimp on each tie rod is broken and the nut is unscrewed while the tip of the plug is held. The top plate is then removed and each tie rod is then turned so that the key can be passed through the slot in the bottom plate. The tie rods may thus be removed and the bundle disassembled without access to the bottom plate. Each tie rod is provided with tabs to prevent axial displacement of the grids.

11 Claims, 4 Drawing Sheets

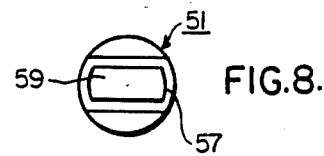
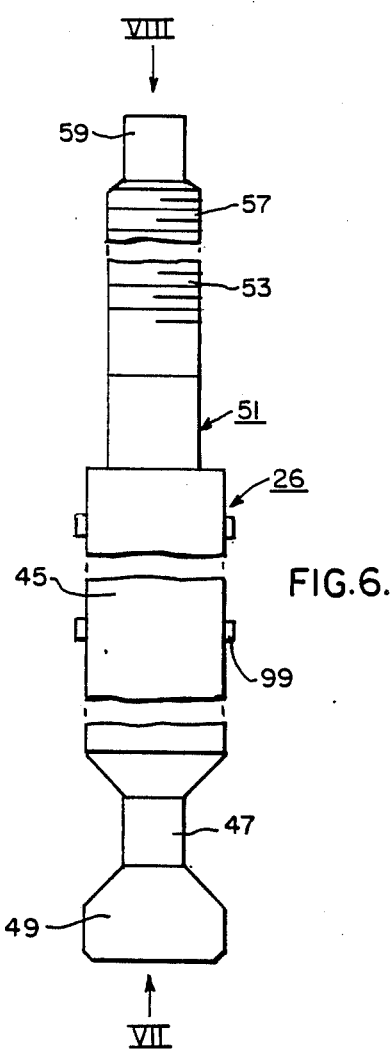
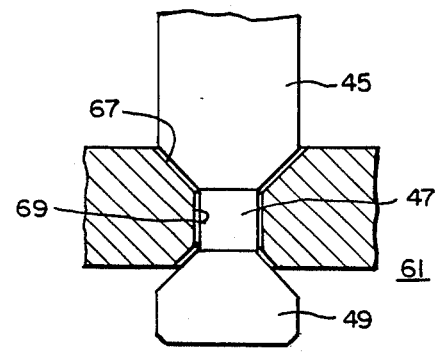
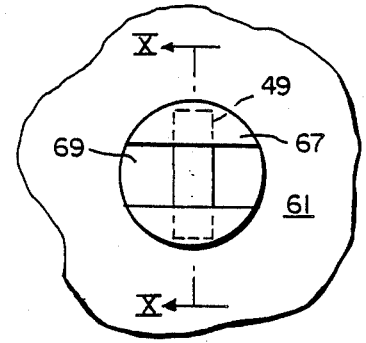
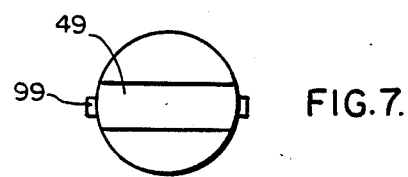

FUEL BUNDLE

This application is a continuation of application Serial No. 06/732,032 filed May 8, 1985 now abandoned.

BACKGROUND OF THE INVENTION

This invention relates to nuclear reactors and has particular relationship to fuel bundles or fuel assemblies. To aid those skilled in the art in practicing this invention by the description of this invention in this application of a concrete structure, this application deals in detail with a fuel assembly of a boiling-water reactor (BWR). To the extent that this invention may be embodied in reactors of other types, such as pressurized-water reactors (PWR), it is understood that such embodiments are within the scope of equivalents of this invention.

A fuel bundle includes a top plate and a bottom plate between which fuel rods are mounted. The fuel rods are held together by axially spaced straps or spacers. In accordance with teachings of the prior art, each bundle is provided with tie rods which are screwed into, or bolted to, the bottom plate. Each prior art bundle also has spacer-capture rods which are secured to the bottom plate by pins to suppress rotation about their axes and have axially spaced tabs to prevent axial displacement of the spacers.

Removal of the tie rods during reconstitution, particularly complete reconstruction, of a fuel bundle presents formidable difficulties because it demands access to the bottom plate, usually in a radioactive environment, to unscrew or unbolt the tie rods and to disengage the spacer-capture rods.

It is an object of this invention to overcome the above-described drawbacks and disadvantages and to provide a fuel bundle which may be readily completely reconstituted by removal of tie rods without access to the bottom plate. It is another object of this invention to provide a fuel bundle in which the spacer-capture rods shall be dispensed with.

SUMMARY OF THE INVENTION

In accordance with this invention there is provided a fuel bundle having one or more tie rods each secured to the bottom plate by a key by means of which the tie rod can be locked to, and unlocked from, the bottom plate without direct access to the bottom plate. Each tie rod is also secured to the top plate by means for preventing rotation of the tie rod. Specifically, the tie rod has at the bottom a flat key which passes through a slot in the bottom plate. The tie rod may be locked to the bottom plate by turning the rod so that the key is at an angle to the slot under the bottom plate. At the top the tie rod has a flattened plug whose transverser cross-section resembles a race track. The plug has a thread on its rounded sides. A nut is threaded onto the thread on the plug and engages the top plate. The plug passes through a slot in the top plate. The nut has a crimping lip which is crimped to the plug. To disassemble the bundle the crimp for each tie rod is broken by turning the nut. The nut and top plate can then be removed and the tie rod turned to unlock the key and removed by access to the top of the bundle. The plug has a flat tip which may be engaged to prevent rotation of a tie rod when the crimp is broken and the nut unscrewed by turning the nut. Since the tie rods of this invention are not rotatable they may carry the tabs which prevent displacement of the straps and the spacer-capture rods may be dispensed with.

BRIEF DESCRIPTION OF THE DRAWINGS

For a better understanding of this invention, both as to its organization and as to its method of operation, together with addition objects and advantages thereof, reference is made to the following description, taken in connection with the accompanying drawings, in which:

FIG. 6 is a view in side elevation of a tie rod in accordance with this invention;

FIG. 7 is a bottom view of this tie rod taken in the direction VII of FIG. 6;

FIG. 8 is a plan view of the top of the tie rod taken in the direction VIII of FIG. 6;

FIG. 9 is a fragmental plan view of the portion of a bottom plate enlarged through which the key at the lower end of the tie rod according to this invention penetrates;

FIG. 10 is a view in section taken along line X-X of FIG. 9;

DETAILED DESCRIPTION OF THE INVENTION

Figure 1:
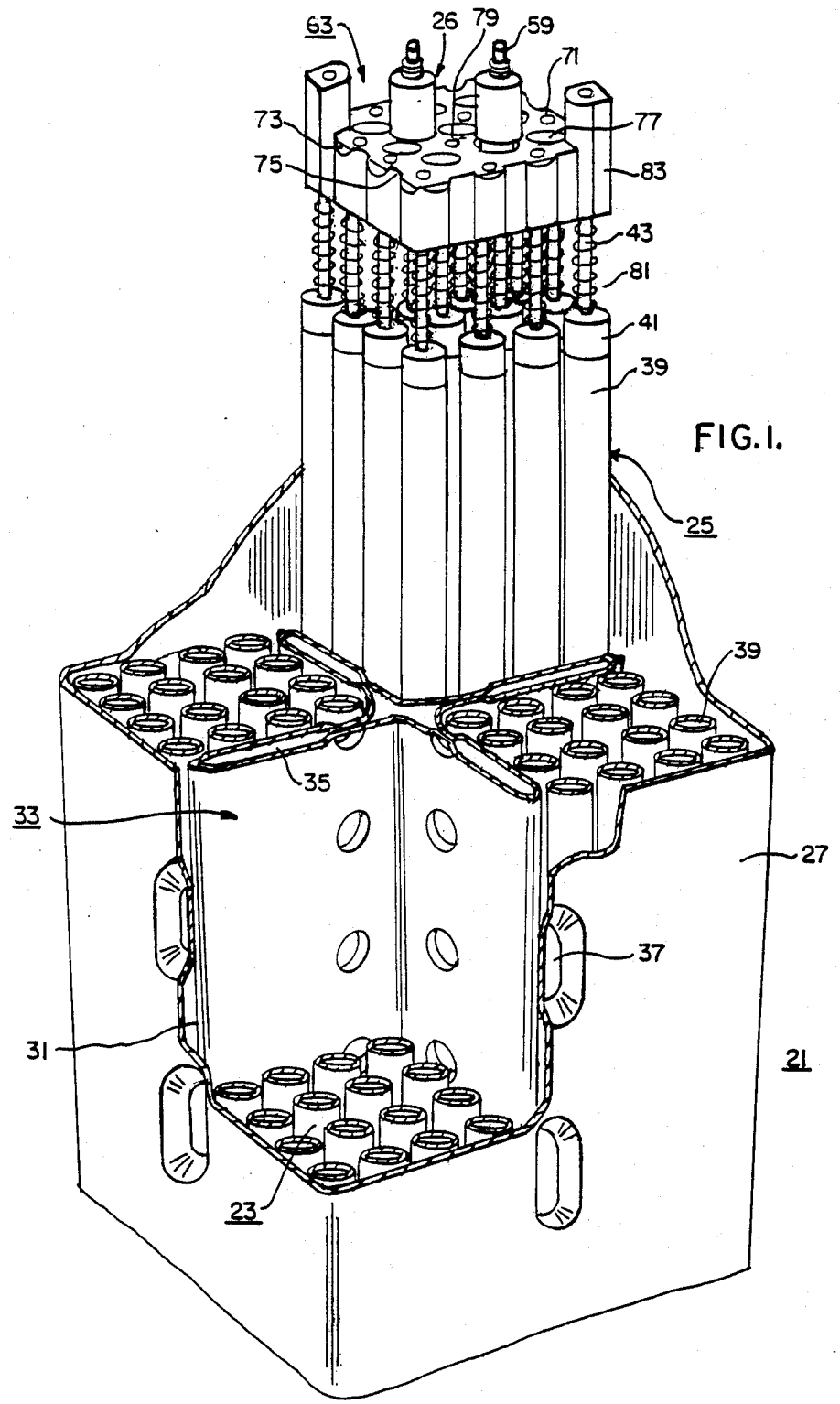
FIG. 1 is a fragmental view in isometric of a fuel assembly in which this invention is embodied this assembly shows the upper end of one fuel bundle above the grids; (93, FIG. 2)

FIG. 1 shows a fuel assembly 21 including a plurality of fuel bundles 23. Each bundle 23 includes a plurality of conventional fuel rods 25 and one or more tie rods 26 in accordance with this invention. The fuel rods 25 and tie rods 26 are arrayed in a square array typically of 16 rods (4×4). The bundles 23 are typically arrayed in a square array (2×2) each defining a quadrant of the assembly. The bundle array is wrapped in a plate 27 of generally square cross-section defining a channel for coolant. The bundles 23 are spaced from each other defining a cruciform gap 31 through which coolant flows. A coolant conductor 33 extends into the gap 31. The conductor 33 is in the form of a cross whose arms are hollow shells of generally elongated oval cross section defining channels 35 through which coolant is conducted. Coolant also flows outside of the conductor 33 through the gap 31. The channels are open only at the bottom and the top and coolant is typically conducted through the channels between the bottom and the top. The plate 27 is secured to the coolant conductor 33 by welding at dimple 37 distributed axially along the plate. There is communication of coolant (not shown) between the quadrants of the square array of fuel bundles 23.

Figure 2:
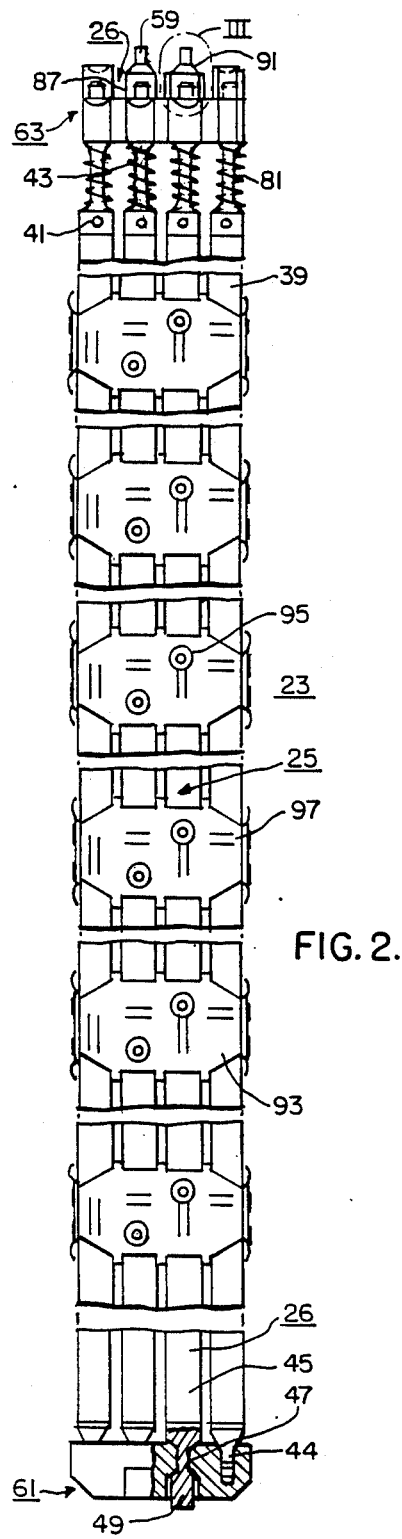
FIG. 2 is a view in side elevation of a fuel bundle in accordance with this invention.

Each conventional fuel rod 25 includes a cylindrical cladding tube 39 within which there is nuclear fuel. The tube 39 has a cap 41 from which a pin 43 extends (FIGS. 1, 2). A tapered pin 44 (FIG. 2) also extends from the lower end of the cladding 39. Each tie rod 26 (FIG. 6) also includes a cylindrical cladding tube 45 containing nuclear fuel. Alternatively, the rod 26 may not contain fuel. At the lower end the tie rod 26 tapers into a stem 47 from which a flat key 49 extends. The key tapers from the stem 47 into a generally rectangular portion. At the upper end the tube 45 has a plug 51. The plug 51 is flattened along the upper portion 53 of its length having in this portion a transverse cross section having a boundary which resembles a race track with rounded ends 57 and flat sides. The upper portion 53 is threaded along the rounded ends. From the end of the rounded portion 53 a flat tip 59 extends.

Figure 4:
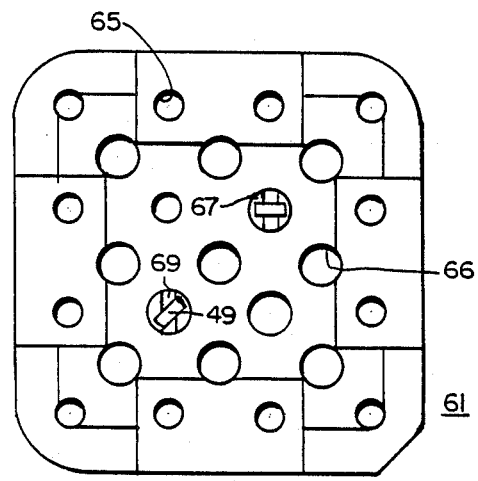
FIG. 4 is a plan view of the bottom plate of the fuel bundle shown in FIG. 2.

Each fuel bundle 23 has a lower end plate 61 and an upper end plate plate 63 (FIGS. 1, 2). The lower plate 61 is a generally rectangular block having holes 65 (FIG. 4) for receiving the tapered pins 44 extending from the conventional fuel rods 25 and holes 66 for passage of coolant. The plate 61 also has a pluralaity of holes 67 in each of which a slot 69 is interposed. The holes 67 are countersunk from the top and bottom as shown in FIG. 10. The tie rod 26 is inserted in each of the holes 67 oriented so that the key 49 passes through the slot 69. When the tie rod is rotated about its axis through an angle such as 45° or 90°, the key 49 locks the tie rod in the lower plate against removal (FIG. 9).

Figure 5:
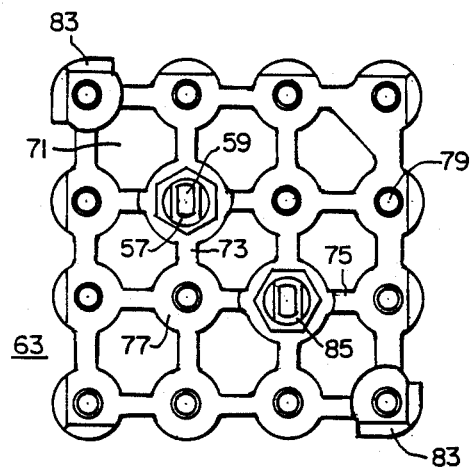
FIG. 5 is a plan view of the top plate of the fuel bundle shown in FIG. 2.

The upper plate 63 (FIG. 5) is a block in the form of a grid having openings 71, whose boundaries are generally octagonal for upward coolant flow. The openings 71 are defined by intersecting members 73 and 75 structured to form regions 77 of generally circular section at their intersections. Holes 79 pass concentrically through regions 77. Certain (most) of these holes 79 are coaxial with the holes 65 in the lower plate 61. Each conventional fuel rod 25 is supported between a hole 65 in the lower plate 61, in which its pin 44 (FIG. 2) is engaged, and the corresponding coaxial hole 79 in upper plate 63. The rod or pin 43 (FIGS. 1, 2) which extends from the cap 41 engages the hole 79 slideably penetrating through the hole. Each rod 43 is encircled by a coil spring 81 which engages the corresponding cap 41 at one end and the upper plate 63 at the opposite end positioning the upper plate 63 with reference to the fuel rods 25. The upper plate 63 has diagonally disposed posts 83 (FIGS. 1 and 5) which serve to align the fuel bundle in the upper nozzle (not shown) associated with the fuel bundle.

Figure 11:
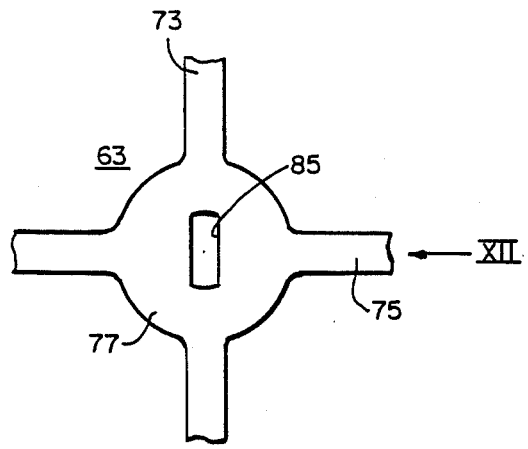
FIG. 11 is a fragmental plan view showing the part of the top plate through which the upper end of a tie rod according to this invention penetrates.
Figure 12:
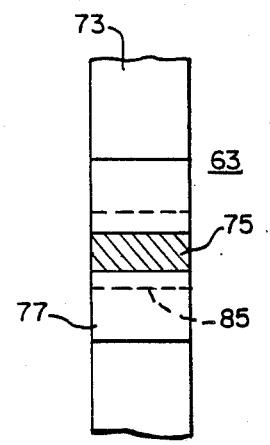
FIG. 12 is a fragmental view in side elevation and partly in section taken in the direction XII of FIG. 11.

The upper plate 63 also has one or more slots 85 (FIG. 11) each of which is coaxial with a slotted hole 67 in the lower plate 61. Each of these slots has the race track contour of the outer surface of the upper portion 53 of the plug 51. Each slot 85 is so oriented that with a tie rod 26 turned so that the key 49 is in the locked position, the upper portion 53 passes through the slot 85 and is prevented from turning.

In assembling the apparatus, the fuel rods are positioned with the pins 44 in the holes 65 and the tie rods 26 are locked in the holes 67. The springs 81 are mounted on the rods 43. Similar springs may also be mounted on the lower portion of plug 51. Then the upper plate 63 is positioned with pins 43 of each fuel rod 25 passing through the hole 79 in the upper plate which is coaxial with the hole 65 in the lower plate 61, in which the fuel rod is seated on its pin, and the portion 53 of each time rod 26 engaging and passing through the hole 85 in the upper plate 63 which is coaxial with the hole 67 in the lower plate 61 in which the tie rod is locked.

Figure 3:
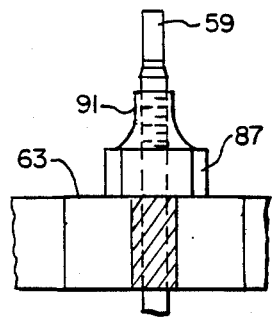
FIG. 3 is a fragmental view enlarged of the part of the fuel bundle of FIG. 2 in oval III.
Figure 13:
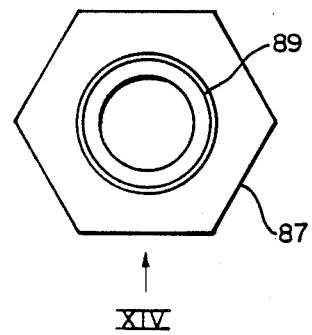
FIG. 13 is a plan view of the nut which locks the tie rod according to this invention.
Figure 14:
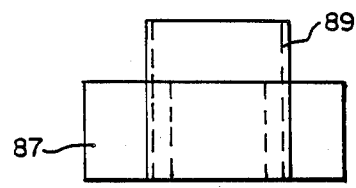
FIG. 14 is a view in side elevation taken in the direction XIV of FIG. 13.

A nut 87 (FIGS. 2, 3, 13, 14) is threaded on the thread of portion 53 of the plug 51 of the tie rod 26. The nut 87 engages the upper surface of the upper plate 63. A crimping lip or shell 89 (FIG. 14) of circularly cylindrical transverse cross-section extends integrally from the locking lip of the nut. After the nut 87 is threaded onto portion 53 and seated on the surface of upper plate 63, the crimping lip 89 (FIGS. 13, 14) is crimped to the portion 53 above the nut forming a crimped surface 91 (FIGS. 2, 3) of generally frusto conical shape whose transverse cross-section is generally oval. The tie rods are now secured firmly against turning about their axes.

The fuel rods 25 of the fuel bundle 23 are secured together by the grids 93 (FIG. 2) spaced along the length of the bundle. Each grid includes dimples 95 and leaf springs 97 in each cell (not shown) which springs exert a resilient force on one side of each cell urging the dimples on the opposite side into engagement with each fuel rod 25 passing through the cell. To prevent the grids 93 from sliding along the bundle 23 under the force exerted by the coolant, which usually flows in and out of the reactor at a velocity typically of 50 ft. per second, tabs 99 (FIG. 6) are provided along the outer surface of each tie rod 26. Since the coolant flows upwardly in the normal operation of a reactor, it may be adequate to provide tabs 99 only above each grid 92 (six sets in the core of bundle shown in FIG. 2). However, typically tabs 99 are provided both above and below each grid 93. The tie rod 26 thus serves the additional purpose of the spacer-capture rods of the prior art and the spacer-capture rods may be dispensed with.

To disassemble a fuel bundle 23, the tip 59 of each tie rod 26 is held by a wrench which is usually remotely operated. The nut 87 is then turned by a second remotely operated wrench. The crimp 91 is broken and the nut 87 is removed. After the nuts 87 are removed from all tie rods 26, the upper plate 63 is removed. The tie rods 26 are turned to the unlocked position and the fuel bundle can be reconstituted as required.

While a preferred embodiment of this invention has been disclosed herein, many modifications thereof are feasible. This invention is not to be restricted except insofar as is necessitated by the spirit of the prior art.

I claim:

1. A fuel bundle for a nuclear reactor including a top plate, a bottom plate, a plurality of nuclear fuel elements extending between said top and bottom plates, said fuel bundle also including at least one tie rod extending between said plates, a key extending from the bottom of said tie rod, a receptacle for said key in said bottom plate enabling said key to penetrate through said bottom plate and to be turned by turning said tie rod, said key and receptacle being formed so that by said turning of said tie rod in said receptacle, said key positively blocks the removal of said bottom plate by engagement with the under surface of said bottom plate, said tie rod having an end plug at the top extending through said top plate and said fuel bundle including means for engaging said plug to lock said tie rod positively with said key turned to said blocking position and also including a locking cup interconnected with both said engaging means and said plug, said plug and locking cup cooperating to suppress rotation of said tie rod to prevent said tie rod from becoming undesirably disengaged.

2. The fuel bundle of claim 1 wherein the tie rod is a nuclear fuel element.

3. The fuel bundle of claim 1 wherein the key is a generally flat plate extending from the bottom of the tie rod and the receptacle includes a slot in the bottom plate shaped to pass said flat plate to a position below the slot, whereby by turning the tie rod, the key is turned so that removal of the tie rod is blocked by the under surface of the bottom plate.

4. The fuel bundle of claim 1 wherein the tie rod at its upper end is provided with a threaded end plug having flattened axially extending surfaces, and the top plate has a generally rectangular slot through which said end plug passes, the thread on said end plug being engaged by a nut, to secure said tie rod to said top plate.

5. The fuel bundle of claim 4 wherein the nut has a crimping lip which is crimped to the flattened surfaces of the end plug.

6. The fuel bundle of claim 1 having spacer-grids along its length, wherein the at-least one tie rod includes tabs along its length to prevent displacement axially of the grids.

7. A fuel bundle for a nuclear reactor including a top plate, a bottom plate, a plurality of nuclear fuel elements extending between said top and bottom plates, said bundle also including at least one tie rod extending between said top and bottom plates, a key extending from the bottom of said tie rod, a slot in said bottom plate shaped with respect to the contour of said key so as to be penetrated by said key to the underside of said bottom plate, said key, on penetrating said slot, being rotatable by rotating said tie rod to a position in the underside of said bottom plate in which said key is at an angle to said slot, said tie rod having an end plug at the top, said end plug having a non-circular transverse cross-section and said top plate having a non-circular opening engaged by said end plug, said opening having an inner peripheral shape matching the non-circular outer-surface of said end plug and said end plug being a slip fit in said opening, and means, connected to the top of said tie rod, for securing said tie rod to said top plate with said key at an angle to said opening whereby said tie rod is simultaneously locked positively to said bottom plate by the engagement of said key with the underside of said bottom plate by said securing of said rod to said top plate.

8. A fuel bundle for a nuclear reactor including a top plate, a bottom plate, a plurality of nuclear fuel elements extending between said top and bottom plates, said fuel bundle also including at least one tie rod extending between, and penetrating, said top and bottom plates, a key extending from the bottom of said tie rod, a receptacle for said key in said bottom plate enabling said key to penetrate through said bottom plate on penetration of said bottom plate by said tie rod and to be turned by turning said tie rod, said key and receptacle being formed so that by said turning of said tie rod in said receptacle, said key positively blocks the removal of said bottom plate by engagement with the under surface of said bottom plate, said tie rod having an end plug at the top extending through said top plate on penetration of said top plate by said tie rod and said fuel bundle including means for engaging said plug to lock said tie rod positively with said key turned to said blocking position and also including a locking cup extending from said engaging means and engaging said plug, said plug and locking cup cooperating to suppress rotation of said tie rod to prevent said tie rod from becoming undesirably disengaged.

9. A fuel bundle for a nuclear reactor including a top plate, a bottom plate, a plurality of nuclear fuel elements extending between said top and bottom plates, said fuel bundle also including at last one tie rod extending above the top of said top plate and below the bottom of said bottom plate, said tie rod including a key extending from the bottom of said tie rod and said bottom plate including a receptacle for said key enabling said key to penetrate said bottom plate and to be conditioned by turning said tie rod, to be locked positively to the underside of said bottom plate, said tie rod having an end plug at the top, said end plug having a non-circular transverse cross-section and said top plate having a non-circular opening engaged by said end plug, said opening having an inner peripheral shape matching the non-circular outer-surface of said end plug and said end plug being a slip fit in said opening, and means, cooperative with said key and tie rod, with said end plug of said tie rod near its top above said top plate, for, both, locking said tie rod to said top plate and positively locking said key to said underside of said bottom plate.

10. The method of forming a fuel bundle of a nuclear reactor, said fuel bundle being formed of a top plate, a bottom plate, a plurality of fuel rods, and at last one tie rod, said tie rod having a key near its lower end and at its upper end being of non-circular transverse cross-section, said top plate having a non-circular opening to engage said upper end, said opening in said top plate having an inner peripheral surface which matches the outer surface of said upper end, said upper end being a slip fit in said opening in said top plate, and said upper end having a length so that it is capable of penetrating said opening and extending at least in part above said top plate, and said bottom plate having a receptacle for said key; the said method including: positioning said fuel rods in said bottom plate, positioning said tie rod in said bottom plate with said key passed through said receptacle to the underside of said bottom plate, after said tie rod is so positioned turning said tie rod so that the key is in engagement with the underside of said bottom plate, thereafter mounting said top plate in engagement with said fuel rods with the upper end of said tie rod extending through said opening in said top plate and extending above said top plate, and next securing said tie rod to the upper side of said top plate thus simultaneously securing said key to the underside of said bottom plate.

11. The fuel bundle of claim 9 wherein the tie rod has a plug having an end that has a flattened contour in transverse cross section, said end extending above the top of the top plate, said top plate having a hole of flattened contour corresponding to the contour of said flattened end for receiving said flattened end, whereby any tendency to said tie rod to turn in said hole on the engagement of the locking means with the top plate is suppressed.

* * * * *